United States Patent [19]

Clark et al.

[11] Patent Number: 4,831,215
[45] Date of Patent: May 16, 1989

[54] AERIAL SPLICE CLOSURES FOR A TELECOMMUNICATIONS CABLE

[75] Inventors: Gordon P. Clark, Beaconsfield; Zbigniew T. Karwowski, Dollard des Ormeaux; Henry Tebinka, Ile Bizard, all of Canada

[73] Assignee: Northern Telecom Limited, Montreal, Canada

[21] Appl. No.: 157,023

[22] Filed: May 16, 1989

[51] Int. Cl.⁴ .......................................... H02G 15/113
[52] U.S. Cl. ................................. 174/92; 174/77 R; 174/93; 174/41
[58] Field of Search ..................... 174/41, 77 R, 92, 93

[56] References Cited

U.S. PATENT DOCUMENTS

| 2,996,567 | 8/1961 | Channell et al. | 174/41 |
| 3,692,926 | 9/1972 | Smith | 174/92 |
| 3,701,835 | 10/1972 | Eisele et al. | 174/92 X |
| 3,796,823 | 3/1974 | Wright et al. | 174/77 R X |
| 4,002,818 | 1/1977 | Kunze | 174/77 R X |
| 4,025,717 | 5/1977 | Whittingham | 174/88 C |
| 4,103,911 | 8/1978 | Giebel et al. | 174/77 R X |
| 4,222,801 | 9/1980 | Gold | 174/77 R |
| 4,387,268 | 6/1983 | Morel et al. | 174/92 |
| 4,405,083 | 9/1983 | Charlebois et al. | 249/97 X |
| 4,486,620 | 12/1984 | Ball et al. | 174/92 X |
| 4,558,174 | 12/1985 | Massey | 174/92 |
| 4,648,606 | 3/1987 | Brown et al. | 273/148 B |
| 4,670,980 | 6/1987 | Charlebois et al. | 29/869 |
| 4,704,499 | 11/1987 | Faust | 174/41 X |
| 4,725,035 | 2/1988 | Charlebois et al. | 277/123 X |

FOREIGN PATENT DOCUMENTS 848364 9/1952 Fed. Rep. of Germany .... 174/77 R

Primary Examiner—Morris H. Nimmo
Attorney, Agent, or Firm—R. J. Austin

[57] ABSTRACT

Aerial splice closures with a closure casing of two casing portions and an elastomeric seal at each end of the closure. Each seal has two seal halves with each seal half having an outwardly extending resilient lug which passes through an aperture formed in its casing portion to mount the seal half in the casing portion. Preferably, each lug has a lateral flange which engages the outside surface of the casing portion.

7 Claims, 3 Drawing Sheets

AERIAL SPLICE CLOSURES FOR A TELECOMMUNICATIONS CABLE

This invention relates to aerial splice closures for a telecommunications cable.

Aerial splice closures for telecommunications cable are of various designs. In all of these designs problems have been found with forming seals between the closure and the outside surface of the cable where the cable passes through into the closure. Conventionally, the method of sealing a splice closure to a cable is such that the closure casing and the sealing arrangement necessitate the use of two or more parts which cannot be assembled together until the splice closure is being assembled to the cable in-situ. It will be appreciated that the assembly of the parts of the closure in this position is highly inconvenient and it would be more practical (considering the needs of the closure installer) for a closure to be reduced to as few parts as possible before reaching the in-situ position.

Recently a closure has been designed in which closure seals at the ends of the closure casing are either molded into positions in the casing or an adhesive is used to hold the seals in position within the casing. In the former case, casing parts are inconveniently used as part of the mold during the molding procedure and in the latter case, an extra step and extra material (i.e. the adhesive) is required in forming the sub-assembly of seals and casing.

The present invention seeks to provide an aerial splice closure for telecommunications cable in which seals may be secured to the casing while avoiding the above inconvenient manufacturing steps.

Accordingly, the present invention provides an aerial splice closure for telecommunications cable having a closure casing comprising two casing portions, each of which extends end-to-end of the closure with the casing portions hinged together along a hinge line extending longitudinally of the casing for relative movement to open and close the casing, and two elastomeric seals, one at each end of the closure, each seal comprising two molded elastomeric seal halves located one within an end of each casing portion with an outer surface of each seal half sealingly engaging the casing portion, the seal halves sealingly abutting one another for sealing around a cable passing between the halves when the casing is closed, each seal half formed with at least one outwardly extending resilient lug which passes through an aperture formed in its corresponding casing portion and is resiliently deformed to retain the seal half to the casing portion.

With constructions according to the invention, the lugs enable the seal halves to be attached and removed at will from the casing portions. Accordingly, the seal halves may be inserted into the casing portions in a convenient location thereby avoiding the necessity of forming the subassembly in an in-situ position above the ground at the splice location. In addition, because the seal halves may be releasably attached to the casing portions, then seal halves may be interchangeable with other seal halves of different construction and adaptable for sealing around cables of different diameters. In a particularly preferred arrangement, at least one of the casing portions has mounted thereon a means for securing the casing to an aerial supporting strand and the casing portions carry a latching means for releasably retaining the casing portions in the closed position of the closure. With the latter preferred construction, the closure is completely assembled as a unit before reaching the in-situ position. As a result, it is merely necessary for the installer to locate the open closure around the aerial cable and to move the casing portions into the closed position so as to seal against the cable and seal the inside of the closure containing a splice from the outside environment. Thus the need to assemble parts of the closure in the in-situ position is completely avoided.

One embodiment of the invention will now be described by way of example, with reference to the accompanying drawings, in which:

FIG. 7 is a cross-sectional view taken along line VII—VII in FIG. 2 to show the seal in use.

Figure 1:
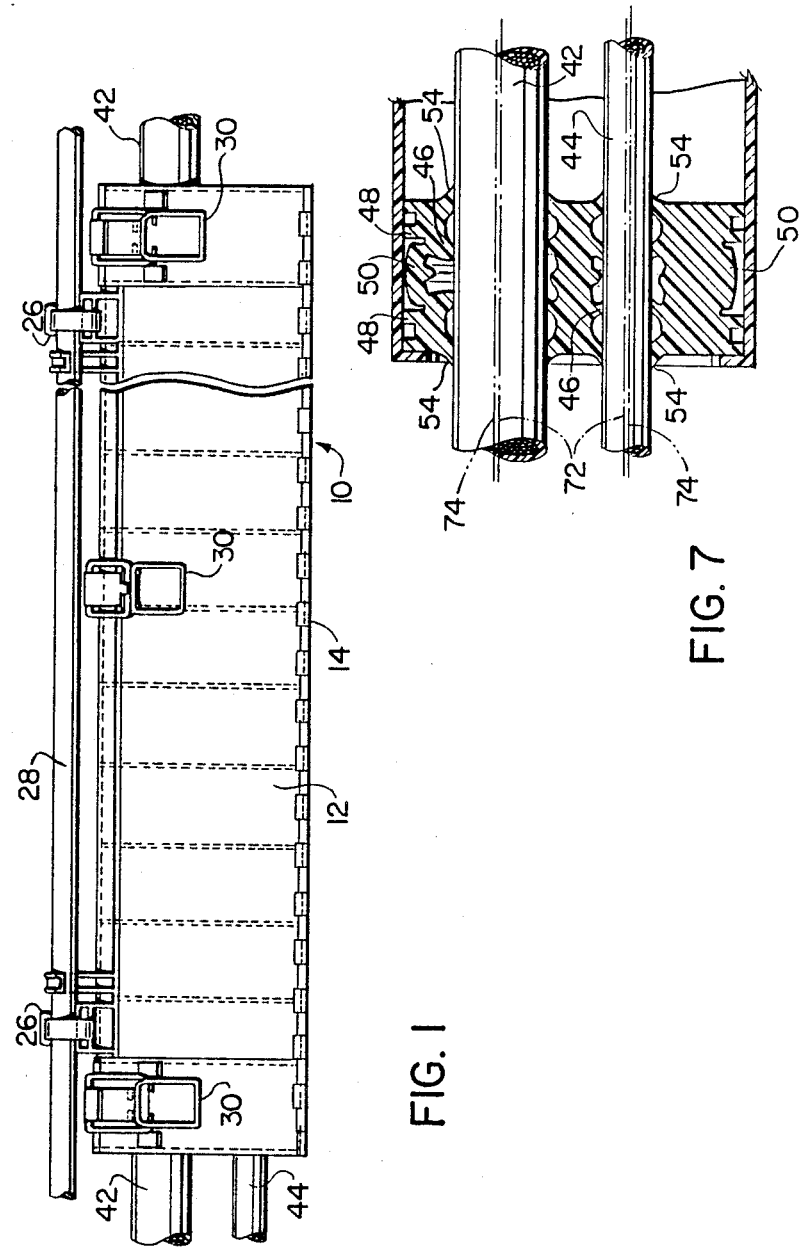
FIG. 1 is a side elevational view of an aerial splice closure in use and in a closed position.
Figure 2:
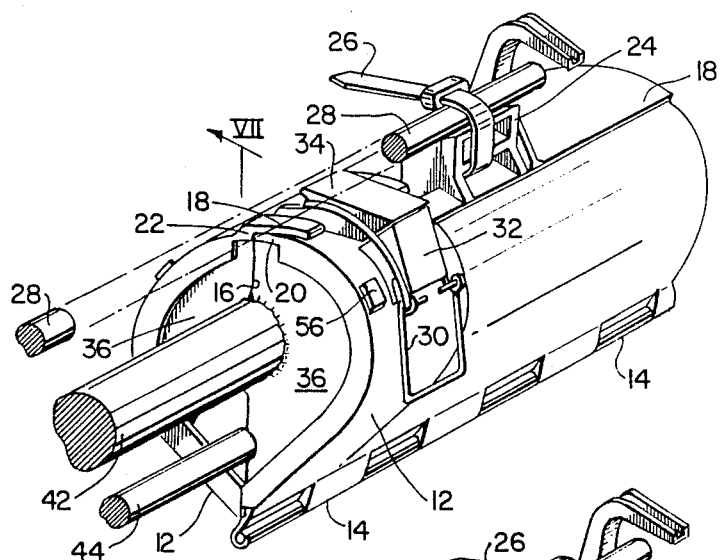
FIG. 2 is an isometric view, and to a larger scale than FIG. 1, upon the left-hand end of the closure in its closed position.
Figure 3:
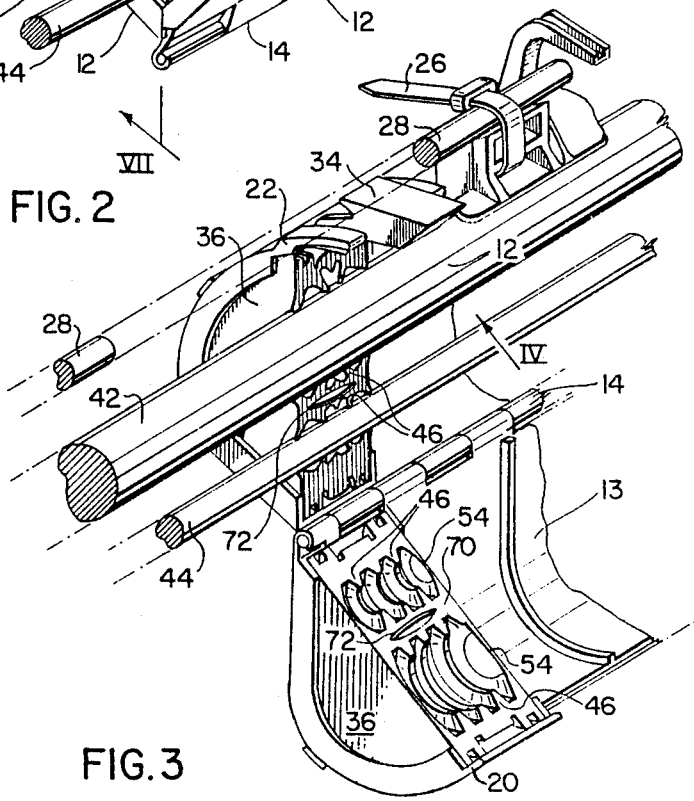
FIG. 3 is a view similar to FIG. 2 showing the closure in an open position.

In the embodiment, an aerial splice closure 10 for telecommunications cable comprises a closure casing which consists of two casing portions or halves 12 more clearly shown in FIGS. 2 and 3. Casing portions 12 extend from end-to-end of the closure and are hinged together by a hinge 14 which also extends from end-to-end of the closure to enable the closure halves to be moved from an open position (FIG. 3) to a closed position (FIG. 2). The end 18 of one of the closure portions remote from the hinge 14 extends beyond a junction plane 16 of the halves 12 so as to overlap the other mold half to prevent the ingress of moisture into the inside of the closure. As can be seen from FIG. 2, as a design consideration, the overlapping end 18 at the end of the closure terminates at a position shorter than the remainder of that end to facilitate the closing of the portions 12 together around the seal. The overlapped free end 20 of the one closure portion 12 is shaped to fit within a complementary seat 22 of the other closure portion to prevent the ingress of moisture from the ambient atmosphere.

The casing is provided with means for securing the casing to an aerial supporting strand and also for latching the casing portions together. The means for securing the casing to the aerial supporting strand comprises spaced strand mounting blocks 24 and associated straps 26 which may be passed through holes beneath the supporting blocks and then around the aerial support strand 28 shown in FIGS. 2 and 3. The latching means comprises three overcenter devices in the form of wire securing straps 30 which are pivotally mounted at one part to a support structure 32 on one closure 12 and latch around a keeper 34 on the other closure portion.

At each end, the closure has a seal for sealing around cables entering the closure to form a splice. The seal at each end of the closure is split diametrically to provide two seal halves 36 which are detachably mounted one in each casing half 12. As is more clearly shown in FIGS. 4 and 5, each seal half 36 is formed with two substantially cylindrical recesses 38 and 40 for forming a cavity in the assembled condition of the seal for surrounding a main cable 42 and a secondary cable 44 leading into the closure and to the splice region. Each seal half also comprises two sealing ribs 46 which are spaced apart axially along each of the recesses 38 and 40 and extend into the recesses. With the closure in its closed position (FIG. 2), each of these ribs 46 circumferentially abuts a corresponding rib on the other seal half effectively to form an annular sealing rib surrounding the associated cable. Each of the ribs 46 axially bridges a base 48 disposed at an end of the seal half and a rib stiffening portion 50 which is spaced axially of each of the bases 48 and lies between them. As can be seen, in a normal unstressed condition, the stiffening element 50 is spaced radially within the radial outer limits of the bases 48 so that, with the seal in position within its closure half 12, a gap 52 is provided between the stiffening element and the closure.

Each seal half is also provided with a resiliently flexible diaphragm 54 at each end of its recesses 38 and 40, the diaphragm extending to a position level with a flat side 56 of the seal half which mates against a corresponding side 56 of the other half when the seal is assembled. The diaphragms 54 for each recess operate to close the ends of the recess in the event that no cable extends through them from inside the closure after the assembly is made, the diaphragms effectively sealing the recess and the inside of the closure from ambient atmospheric conditions. In addition, as can be seen from FIG. 7, the diaphragms 54 are resiliently deformed outwardly when a cable passes through the appropriate recess 38 and 40 so as to form at least a partial seal around the cable to resist ingress of moisture. The full sealing effect however is created by the ribs 46 as shown by FIG. 7, the ribs flexing about their bases 48 in a radial direction across the stiffening elements 50 so as to deflect the stiffening element radially outwards into the space 52. The material of the seal halves is an ethylene-propylene terpolymer with a Shore hardness of less than 15 and preferably less than 10 so that the material is particularly soft and pliable. Thus the seal halves 36 would easily be deflected outwardly without any resilient support and their sealing effect could be suspect. However, the stiffening elements 50 resist the outward movement of the ribs 46 by a circumferential stretching of the stiffening elements whereby sufficient resilient resistance is offered to the ribs 46 so that they are forced under a constant load against the cable surfaces to provide an effective seal. With this structure having such a soft material for the seal halves, the seal may accommodate cables through a relatively large range of diameters in each of the recess 38 and 40 while providing an effective seal because of the co-action between the ribs 46 and the stiffening element 50.

Figures 4, 5:
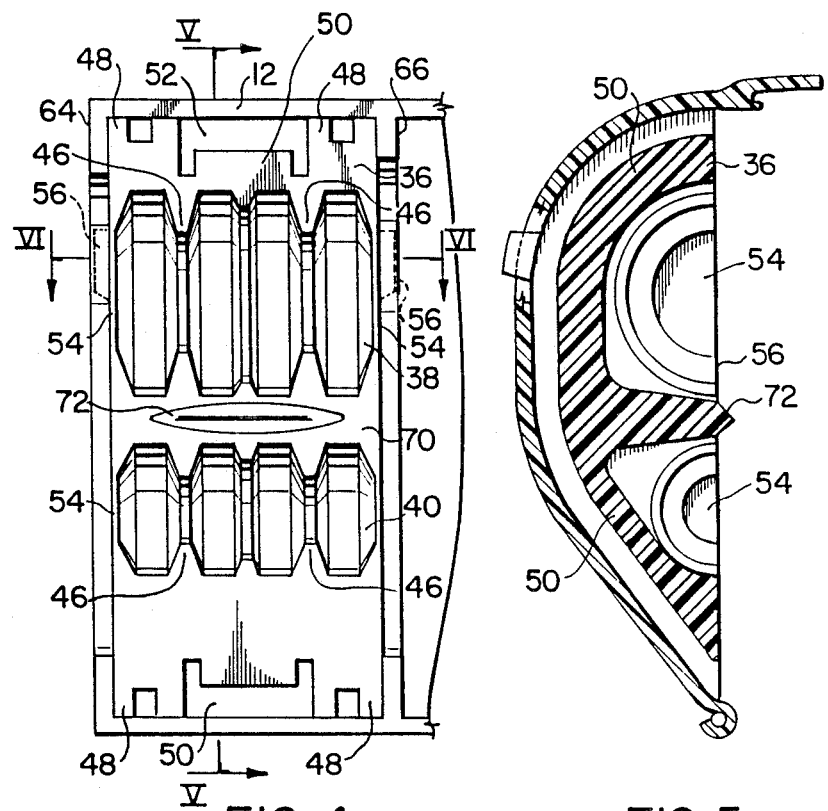
FIG. 4 is a view in the direction of arrow IV in FIG. 3 and showing details of an end seal.
FIG. 5 is a cross-sectional view of the seal taken along line V—V in FIG. 4.
Figure 6:
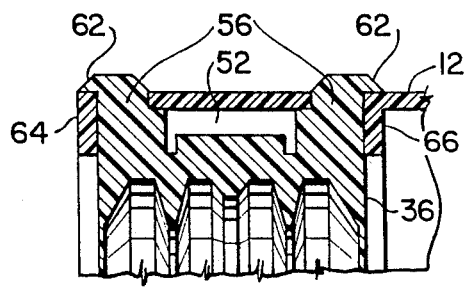
FIG. 6 is a cross-sectional view taken along line VI—VI in FIG. 4 to show the method of assembly of a seal to the casing.

Each of the seal halves is mounted within its casing portion 12 by a means which allows for release of the seal halves should this be necessary, possible for replacement purposes. The mounting means comprises a pair of resilient lugs 56 which are molded integrally with the bases 48 of each seal half and are axially spaced apart as shown in FIGS. 4 and 6. Each lug 56 has a radially outwardly extending portion for passing through a respective aperture provided through its supporting closure half 12 (FIG. 6). A lateral flange 62 on each of the lugs lies outside the closure half and confronts and engages the outside surface of the closure half as shown by FIG. 6. Each of the lugs is dimensioned so that compression of the lugs is necessary for them to be forced through the apertures during mounting. To provide a sealing action with the sides of the apertures, reliance is placed upon the compression of the material of the seal halves when the closure is in a closed position as shown in FIG. 2, this compression causing expansion of the lugs 56 inside the apertures to press intimately into engagement with the aperture surfaces.

As can be seen also from FIGS. 6 and 7, each of the seals is positioned at an end of its supporting closure half 12 and between an end flange 64 and a flange 66 spaced appropriately along the closure portion from flange 64 to accommodate the seal between and in close sealing relationship with the flanges. Thus, the flange 64, by virtue of its engagement with the seal half, resists any tendency for moisture to pass between the seal and the closure half. Should any moisture penetrate and proceed between the first base 48 and the closure, then upon reaching the space 52 it will merely run along the inside surface of the closure and out through the hinge position 14.

As can be seen from the above description, the closure is a complete assembly of hinged closure portions including seal halves, latching mechanism and the block for mounting the structure upon the aerial support strand 28. It is completely unnecessary, therefore, to assemble parts of the closure in-situ around aerial cables and seals do not need to be cut or assembled around a cable in the in-situ position. In contrast, the seal is raised from ground level in the condition shown in FIG. 3, and is positioned with the axial support strand 28 against the spaced mounting blocks 24. The straps 26 are then secured around the support strand with the closure in the open position. The closure lies to one side of the cables and the cables are then aligned and pushed into the appropriate recesses 38 and 40 of one seal half 36 so that the open closure is in the position shown in FIG. 3. It is then merely necessary for the part of the closure hanging down from the hinge position to be pivoted upwards from the position shown in FIG. 3 to that shown in FIG. 2 and the wire latches to be positioned across the keepers 34 and pulled to the overcenter position shown in FIG. 2 so as to lock the closure halves together. This movement causes the seal halves to abut along their opposing side surfaces 56 and compression of the seals takes place to deform the ribs 46 and the rib stiffening element 50 outwardly so that the ribs 46 provide the required sealing operation. In addition, the diaphragms 54 are resiliently stretched around the cable at the ends of the apertures. Compression of the soft material of the seal halves forces it towards the seal lungs 56 thereby causing these lugs to expand into sealing engagement with the surfaces of the corresponding apertures in the closure halves.

The recesses 38 and 40 of each seal half are spaced by a partition 70 which abuts against a corresponding partition of the other seal half. Each of these partitions is provided with a projection 72 (FIG. 5) extending outwardly from the side surface 56. These projections 72 mutually engage to cause compression of the ribs 70 thereby ensuring an extremely effective seal between the surfaces of the partitions. It is worthy of mention that because of the presence of the partitions 70, then the ribs 46 in the regions of the partitions 70 are not as deformable and displaceable as they are at regions backing onto the stiffening elements 50. It can be seen from FIG. 5 that the stiffening elements 50 extend upwardly from the partition 70 for recess 38 and downwardly from the partition for the recess 40. It follows, therefore, that to accommodate a cable of any particular diameter then the ribs 46 further from the partitions 70 must deflect to a greater extent than in the regions of the partitions. This causes the axes of the formed cavities and thus of the cables to be spaced further apart than the undeformed recesses 38 and 40. This is shown in FIG. 7 in which the chain-dotted lines 72 shown the positions of the axes of the undeformed recesses 38 and 40 and the chain-dotted lines 74 illustrate the axes of the cables 42 and 44 after the closure is closed around them.

As can be seen from the above-described embodiment, the closure according to the invention and having its seal halves already secured in position to the closure halves renders the assembly of the closure around the aerial cable a comparatively easy operation. In the particular embodiment which has been described, apart from the location of the straps 26 around the blocks 24 to secure the closure to the support strand 28, no further assembly is required. The closure needs merely to be moved from the open position of FIG. 3 to the closed position of FIG. 2 when in the in-situ above ground level. In addition, although the seals are held to the closure halves and form part of the assembly prior to location around a completed splice region, the assembly of the seals to the closure halves is a simple operation which requires no additional materials such as adhesives and thus no further factory operations to provide the means of securement.

What is claimed is:

1. An aerial splice closure for telecommunications cable having a closure casing comprising:
   (a) two casing portions each of which extends from end-to-end of the closure with the casing portions hinged together along a hinge line extending from end-to-end of the casing for relative movement of the casing portions to open and close the casing; and
   (b) two elastomeric seals, one at each end of the closure, each seal comprising two molded elastomeric seal halves located one within an end of each casing portion with an outer surface of each seal half sealingly engaging the casing portion, the seal halves sealingly abutting one another for sealing around a cable passing between the seal halves when the casing is closed, each seal half formed with at least one outwardly extending resiliently compressible lug which passes through an aperture formed in its corresponding casing portion and which is resiliently compressed between the sides of the aperture to retain the seal half mounted to the casing portion and to provide a sealing action with sides of the aperture.

2. A closure according to claim 1 wherein each seal half is provided with two axially spaced apart lugs each received through an individual aperture formed in the corresponding casing portion.

3. A closure according to claim 2 in which each lug has a portion extending outwardly from its seal half, said portion passing through the respective aperture, and a lateral flange which confronts and engages the outside surface of the associated casing portion.

4. A closure according to claim 1 wherein each seal half has at least two seating surface areas contacting the inner surface of the respective casing portion, the seating surface areas spaced apart longitudinally of the closure to provide a space between these areas, and each area extending unbroken around the outer surface of the seal half.

5. A closure according to claim 4 wherein each casing portion has an end flange extending radially inwardly, each seal half engaging the end flange.

6. A closure according to claim 2 wherein the casing portions carry a latching means for releasably retaining the casing portions in the closed position of the closure.

7. An aerial splice closure for telecommunications cable having a closure casing comprising:
   (a) two casing portions each of which extends from end-to-end of the closure which the casing portions hinged together along a hinge line extending from end-to-end of the casing for relative movement of the casing portions to open and close the casing, the casing portions carrying a latching means to hold the casing portions in the closed condition of the casing; and
   (b) two elastomeric seals, one at each end of the closure, each seal comprising two molded elastomeric seal halves located one within an end of each casing portion with an outer surface of each seal half sealingly engaging the casing portion, the seal halves sealingly abutting one another for sealing around a cable passing between the seal halves when the casing is closed, each seal half formed with at least one outwardly extending resiliently compressible lug which passes through an aperture formed in its corresponding casing portion and which is resiliently compressed between the sides of the aperture to retain the seal half mounted to the casing portion and to provide a sealing action with the sides of the aperture.

* * * * *